June 7, 1938.  J. H. O'NEIL  2,120,038
METAL CAN BODY
Filed June 18, 1935
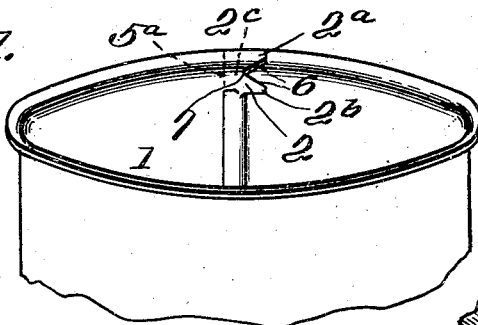
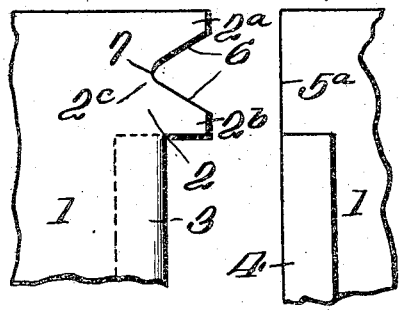
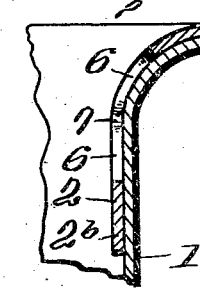
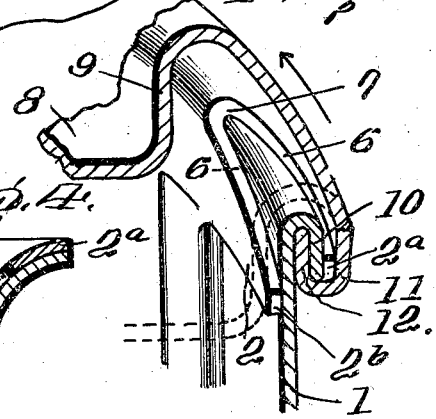
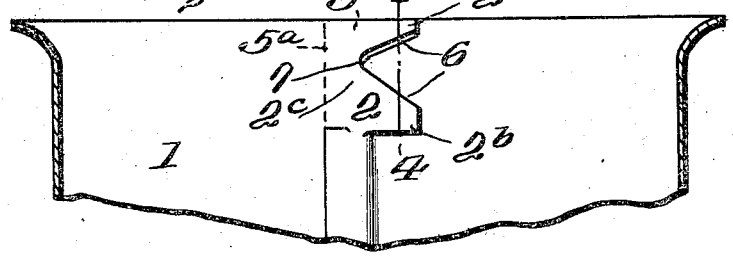
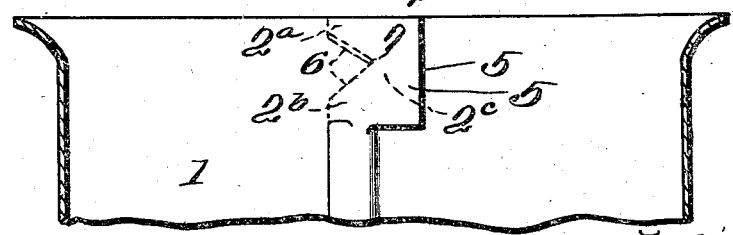
Inventor
James H. O'Neil
By Mason & Porter
Attorneys

Patented June 7, 1938

2,120,038

UNITED STATES PATENT OFFICE

2,120,038

METAL CAN BODY

James H. O'Neil, Syracuse, N. Y., assignor to Continental Can Company, Inc., New York, N. Y., a corporation of New York Application June 18, 1935, Serial No. 27,237

1 Claim. (Cl. 220—62)

The invention relates to new and useful improvements in metal can bodies to which the can ends are attached by double seaming.

It is customary to form a body blank and to provide the ends thereof with hooks and laps; and then interlock the hooks, bump and apply solder throughout the length of the side seam for solder bonding the parts together. After the can body has been thus formed, the ends thereof are provided with flanges to which the can ends are joined by double seaming. The flanges of the can body place a very severe shearing stress on the solder bond joining the lap sections in the region where the metal is shaped to form the flange. The inner lapping section is stretched to a greater extent than the outer lapping section, and this is what causes the shearing stress on the solder bond. This shearing stress on the solder bond may rupture the same, with a resulting leaky can.

An object of the invention is to provide a construction of blank and side seam for a can body wherein the shearing stress on the solder bond during flanging is reduced to a minimum to prevent the rupturing of the bond.

A further object of the invention is to provide a body blank and side seam for a can body wherein the interlocked body hook and end flange at the crossing of the side seam during double seaming will be of substantially the same dimensions as at any point in the double seam.

In the drawing:

Figure 1 is a perspective view of a can body having a can end double seamed to one end thereof while the other end is open and flanged preparatory to receiving a can end for the double seaming operation.

Figure 2 is a plan view of a portion of the two ends of the blank cut to embody the present invention and with hooks formed preparatory to joining for the side seam.

Figure 3 is a sectional view through the can body after the flange is formed.

Figure 4 is a sectional view on the line 4—4 of Fig. 3.

Figure 5 is a view partly in vertical section and partly in perspective from the upper end of the can body and the completed double seam.

Figure 6 is a view similar to Fig. 3 but showing a slightly modified form of the invention.

In carrying out the invention, a body blank is formed from sheet metal of proper shape to produce a cylindrical can body. The body blank as indicated at 1 in Fig. 2 of the drawing which shows portions of the two ends from which the shaping of the blank will be understood. The body blank is slit at one end so as to form a lap section 2 and a hook which is indicated in broken lines at 3: it is slit at its other end so as to form a hook 4 and a lap section 5. The lap section 2 is provided with a V-shaped recess 6, the apex 7 of which is so positioned relative to the lap that it is located close to the beginning of the curvature of the body into the flange which is formed thereon during flanging. This positions the apex of the V-shaped recess so that it will lie close to the top edge of the can body after the hook is formed thereon during double seaming.

The body blank is shaped into cylindrical form and the hooks interlocked and bumped, after which solder is applied for solder bonding the hook portions and the lapping sections in the usual manner.

Figs. 3 and 4 of the drawing show the body as flanged. During this flanging operation, the outer lapping portion of the can body throughout the entire region of the recess 6 is free to curve without producing any shearing stress on the solder bond uniting that portion of the inner lapping section to the outer lapping section which is above and below the recess. There is a very short portion of the solder bond between the vertex of the recess and the opposite side 5a of the lapping sections which will be under some stress during flanging, but the portion 2c of the inner lap which is stretched to a greater extent than the outer lap is so small, relative to the area of the solder bond between the lapping sections, that there is no likelihood of the solder bond being ruptured during flanging.

It is understood that the lapping sections at the lower end of the side seam are formed and shaped in precisely the same manner as those at the upper end of the side seam which have just been described. Instead of forming a recess or V-shaped notch in the inner lapping section, a recess or V-shaped notch can be formed in the outer lapping section, as shown in Fig. 6. The V-shaped notch is precisely the same in construction and functions in the same way, except that when flanging the side edges of the recess will be forced toward each other instead of away from each other as the metal to which they are joined is stretched to produce the flange. Like reference letters have been applied to the recess or notch in this figure.

During double seaming, this recess greatly aids in the forming of the body hook, and the hook on the container end is locked therewith in the region of the cross seam so that it will be substantially of the same dimensions as in any other point in the double seam. The apex 7 of the notch or recess 6 is disposed substantially at the top edge of the body or the base of the body hook, as shown in Fig. 5. The double seaming roll travels in the direction of the arrow in Fig. 5 and, therefore, the pressure which forms the hook on the body will be exerted on the upper lap portion between the inclined edges of the recess and will form a hook on said outer lapping edges of the same extent and dimensions as the hook at any other part of the body. The hook will be uniformly turned by the seaming roll as the pressure of the seaming roll thereon approaches the vertex of the V-shaped notch. As the seaming roll travels over the portion of the side seam between the end of the V-shaped notch and the opposite side of the lapping sections, it will continue to turn a hook of the same dimensions as the body hook on the outer lapping sections. In other words, this V-shaped notch permits the starting of the hook in the region of the side seam so that it is of the same dimensions as the hook at other parts of the can body, and it will continue to maintain a uniform shaping of the hook all the way to the vertex of the V-shaped notch and across the lapping sections.

Referring more in detail to the drawing, the can end is shown at 8 and this end has a portion 9 which extends down inside of the can body. During the seaming operation, the cover flange and the flange of the can body are gradually and progressively rolled into the shaping of the parts shown in Fig. 5.

The flange on the can body is turned down to form a body hook as indicated at 10. The flange on the cover extends down over the hook as indicated at 11 and thence around the inside of the hook as indicated at 12. The apex of the recess is located over the base of the body hook 10, as has been referred to above. The portion 2b of the lapping section 2 is at the inside of the can body, while the portion 2a contacts with the outer face of the body hook 10. These portions 2a and 2b, of course, have their adjacent faces inclined toward each other and meet at the vertex 7 which is substantially at the top edge of the body wall or the base of the body hook 10.

When the hook 10 is of uniform dimensions throughout and across the double seam, the cover flange will fold about the hook so that the dimensions of the completed double seam are substantially the same in the region of the cross seam as at other portions thereof. It is well known that in the ordinary form of lock and lap side seam the seaming roll in cross of the side seam will fail to produce a tight seam at the side of approach because of the non-uniformity of the rolling of the metal parts due to the increased thickness of metal at the lap section of the side seam. It is this non-uniformity in the rolling of the metal parts by the seaming roll that often produces a leak. When the lap sections are constructed as described above, the initial rolling of the outer lap section in the region of the cross seam begins in the space between the walls in the recess and continues along the recess to the vertex thereof; and the rolling of the inner lap section is gradually taken onto the seaming roll. This is the reason why the interlocked hooks are substantially of the same dimension in the region of the side seam as at other points in the double seam. Furthermore, during the double seaming, the strain on the solder bond uniting the lap sections is so distributed that there is no danger of rupturing the solder bond at this time.

It is understood that the usual plastic sealing material is used in connection with the double seam.

Sometimes the double seaming machine for joining the can end to the can body rotates in one direction and sometimes in the other, according to the construction of the machine. The V-shaped notch or recess may be placed on either the inner lapping section or the outer lapping section and should always be placed so that it is on the side approached by the seaming roll during the double seaming operation, for reasons which have been pointed out in full above.

While the particular shaping of the notch or recess shown has special advantages in that it uniformly distributes the bending strains, focusing the final bending strain on the lapping sections at the base of the body hook, it will be understood that this recess or notch may be shaped otherwise than illustrated. It is essential, however, that the notch or recess shall extend in a horizontal direction and enter the lapping section from the side edge thereof.

I claim:

A metal can body having the ends thereof flanged so that can ends may be secured thereto by double seaming, said can body having a solder bonded side seam consisting of interlocking hook portions and lap portions at the ends of the side seam, one of the lap portions at each end of the side seam having a V-shaped recess entering the lap portion from the side edge thereof approached by the seaming roll during double seaming, the apex of said recess being disposed in a line centrally of the base of the body hook formed during double seaming, said side edges of said recess diverging away from each other and terminating at the edge of the lap portion adjacent the outer and inner limits of said lap portion whereby the flange is free to bend to form the body hook at the entrance of said recess.

JAMES H. O'NEIL.